United States Patent
Jackson et al.

(10) Patent No.: US 10,776,895 B2
(45) Date of Patent: Sep. 15, 2020

(54) GPU POWER AND PERFORMANCE MANAGEMENT

(71) Applicant: Apple Inc., Cupertino, CA (US)

(72) Inventors: Dean Jackson, Holt (AU); Jonathan J. Lee, San Francisco, CA (US); Christopher C. Niederauer, Los Altos Hills, CA (US); Gavin Barraclough, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 15/894,622

(22) Filed: Feb. 12, 2018

(65) Prior Publication Data
US 2018/0232847 A1   Aug. 16, 2018

Related U.S. Application Data
(60) Provisional application No. 62/457,698, filed on Feb. 10, 2017.

(51) Int. Cl.
| | |
|---|---|
| G06T 1/20 | (2006.01) |
| G06F 1/3293 | (2019.01) |
| G06F 1/3228 | (2019.01) |
| G06F 1/3215 | (2019.01) |

(52) U.S. Cl.
CPC ............. G06T 1/20 (2013.01); G06F 1/3215 (2013.01); G06F 1/3228 (2013.01); G06F 1/3293 (2013.01)

(58) Field of Classification Search
CPC ........ G06T 1/20; G06F 1/3292; G06F 1/3293
See application file for complete search history.

(56) References Cited

U.S. PATENT DOCUMENTS

| | | | |
|---|---|---|---|
| 2007/0103474 A1* | 5/2007 | Huang | G06T 1/20 345/506 |
| 2010/0164962 A1* | 7/2010 | Sakariya | G09G 5/363 345/502 |
| 2010/0328323 A1* | 12/2010 | Redman | G06F 9/45533 345/502 |
| 2011/0057936 A1* | 3/2011 | Gotwalt | G06F 1/3203 345/504 |
| 2011/0060924 A1* | 3/2011 | Khodorkovsky | G06F 1/3203 713/300 |
| 2011/0134132 A1* | 6/2011 | Wolf | G06F 3/1423 345/502 |
| 2011/0164046 A1* | 7/2011 | Niederauer | G06F 1/3218 345/503 |
| 2011/0169840 A1* | 7/2011 | Bakalash | G06T 1/00 345/505 |
| 2013/0063450 A1* | 3/2013 | Kabawala | G06F 9/5094 345/502 |
| 2014/0366040 A1* | 12/2014 | Parker | G06F 9/542 719/318 |
| 2015/0317762 A1* | 11/2015 | Park | G06T 1/20 345/505 |

(Continued)

*Primary Examiner* — Terrell M Robinson
(74) *Attorney, Agent, or Firm* — Blank Rome LLP

(57) ABSTRACT

Systems, methods, and computer readable media to improve the operation of graphics systems are described. In general, techniques are disclosed for determining the computational need of GPU-centric elements executing from within pages of another application, selecting one or more GPU's appropriate to the need, and transitioning the system to the selected GPUs.

24 Claims, 6 Drawing Sheets

(56) References Cited

U.S. PATENT DOCUMENTS

2016/0055667 A1* 2/2016 Goel ................... G06T 15/83
                                                    345/522
2016/0132083 A1* 5/2016 Jeganathan ........... G06F 1/3234
2017/0060633 A1* 3/2017 Suarez Gracia ...... G06F 9/5044

* cited by examiner

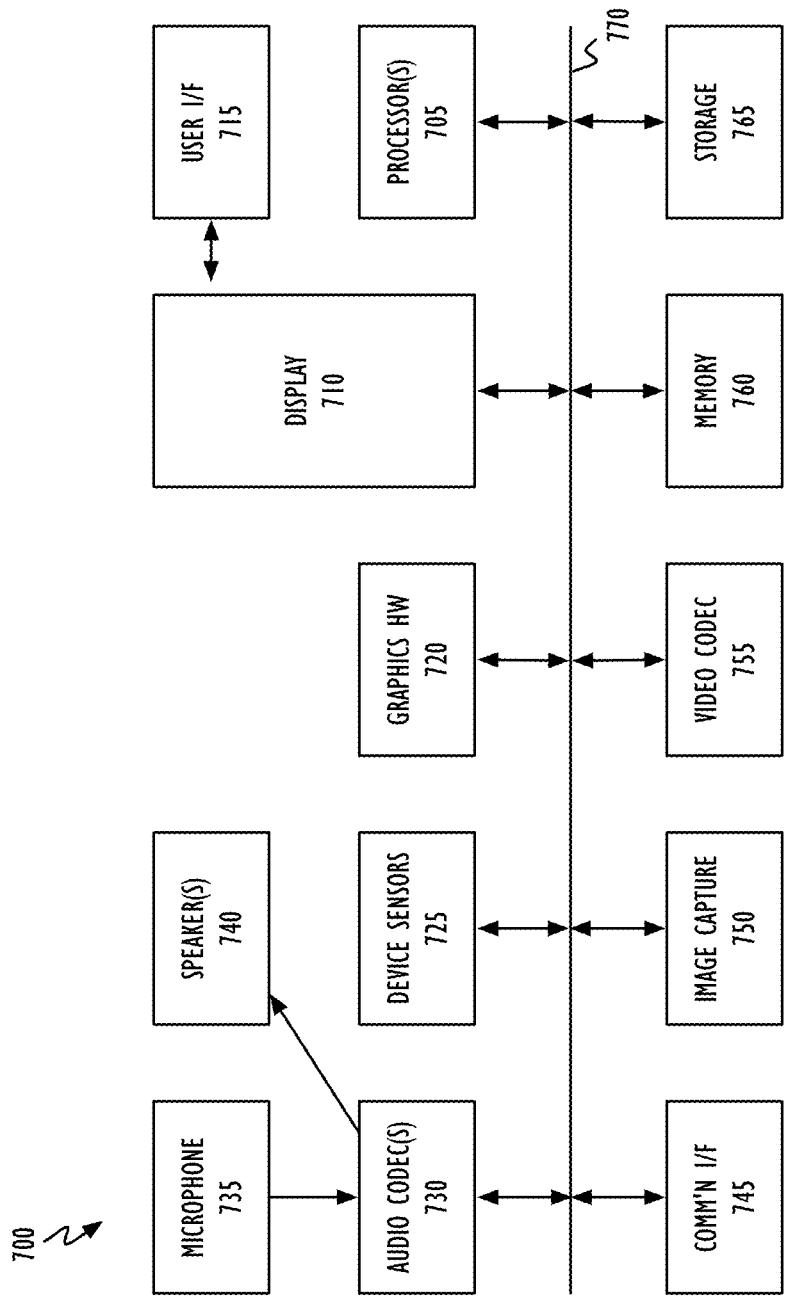

GPU POWER AND PERFORMANCE MANAGEMENT

BACKGROUND

This disclosure relates generally to the use of graphics processing units (GPUs). More particularly, but not by way of limitation, this disclosure relates to a technique for determining the computational need of GPU-centric elements executing from within pages of another application, selecting one or more GPU's appropriate to the need, and transitioning the system to the selected GPUs.

In mobile and embedded devices markets, consumers typically want designs that provide both more power and lower power consumption. As a result application processors have become increasingly heterogeneous, integrating multiple components into a single System-on-Chip (SoC) design. One SoC may include a central processing unit (CPU), a GPU, an image signal processor (ISP), video encoders and decoders, and a radio processing unit. For still further processing power, one or more additional GPUs may be provided. These additional GPUs, because of their power consumption, are often not incorporated directly in the SoC and are instead included as separate functional units. Again because of their power consumption, it is important that the use of such devices is properly controlled to preserve a device's battery life.

SUMMARY

In one embodiment the disclosed concepts provide a method to select a graphics processing units (GPUs) from a collection of GPUs based on the operational characteristics of an object embedded in a page of an application (e.g., an object in a web browser window). The method may include detecting an event in a system based on an action associated with a GPU-centric object, the system having two or more GPUs, the GPU-centric object including GPU instructions and non-GPU instructions. By way of example, the GPU-centric object may be a WebGL object, a WebGPU object or a Stage3D object. The method may then continue by determining, in response to the event, a computational need of the system based on one or more rules. In one or more embodiments the rules may be heuristic in nature and can evaluate a viewable characteristic of the GPU-centric object. Viewable characteristics can include, but are not limited to, determining if: the GPU-centric object changes its operational state from active to idle (or idle to active); or the GPU-centric object changes its operational state from not-viewable to viewable (or from viewable to not-viewable). The method continues by identifying a first GPU of the two or more GPUs is a currently active GPU for the system; identifying, based on the computational need, a second GPU, wherein the second GPU is different from the first GPU; transitioning the system from the first GPU to the second GPU; and executing the GPU-centric object's GPU instructions on the second GPU. In one embodiment, the first GPU has a lower computational capability than the second GPU. In another embodiment, it is the second GPU that has the lower computational capability. In still other embodiments, the operation of transitioning from the first to the second GPU may include evaluating one or more timing restrictions associated with the first and/or second GPU. In one or more other embodiments, the various methods may be embodied in computer executable program code and stored in a non-transitory storage device. In yet another embodiment, the method may be implemented in an electronic device or system having two or more GPUs.

BRIEF DESCRIPTION OF THE DRAWINGS

FIG. 7 shows, in block diagram form, a multi-function electronic device in accordance with one or more embodiments.

DETAILED DESCRIPTION

Figure 1:
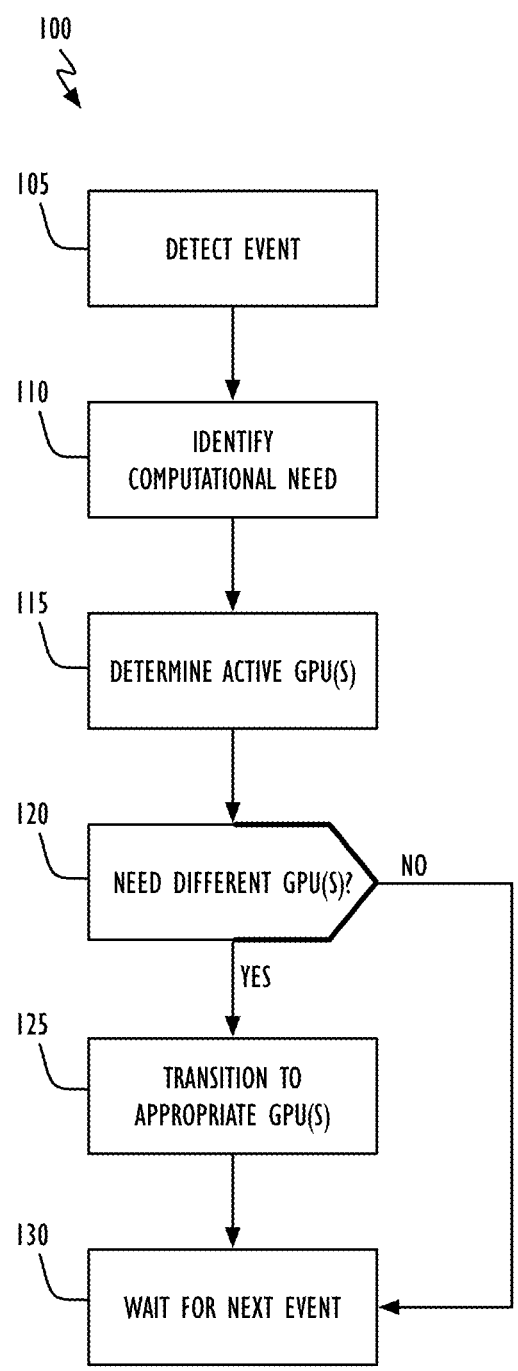
FIG. 1 shows, in flowchart form, a GPU selection operation in accordance with one or more embodiments.

This disclosure pertains to systems, methods, and computer readable media to improve the operation of graphics systems. In general, techniques are disclosed for determining the computational need of GPU-centric elements executing from within pages of another application, selecting one or more GPU's appropriate to the need, and transitioning the system to the selected GPUs.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings are in the form of flowcharts. The boxes in any particular flowchart may be presented in a particular order. It should be understood however that the particular sequence of any given flowchart is used only to exemplify one embodiment. In one or more embodiments, one or more of the disclosed steps may be omitted, repeated, and/or performed in a different order than that described herein. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Embodiments of the GPU selection and transition techniques set forth herein can assist with improving the functionality of computing devices or systems that utilize multiple GPUs. Computer functionality can be improved by enabling such computing devices or systems to select the most appropriate GPU so as to optimize its processing capability while minimizing its power consumption. By way of example, when computational capability is not needed (such as when the device or system's display is not changing), a low(er) computationally capable GPU may be selected (as opposed to a higher performance and higher power GPU), thereby reducing overall system power consumption. Conversely, when computational capability is needed (such as when the device or system's display is changing), a high(er) computationally capable GPU may be selected (as opposed to a lower performance and lower power GPU), thereby increasing the computing device or system's performance. These actions can have the effect of improving the device or system's performance (when needed) and, for mobile devices, extending the device or system's time before its battery needs to be charged.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of multi-GPU computing devices and systems having the benefit of this disclosure.

Referring to FIG. 1, GPU selection operation 100 in accordance with one or more embodiments may begin when one (or more) of a specified number of different events is detected (block 105). Illustrative events include, but are not limited to, visible portions of the display transition from having a large (or small) amount of drawing occurring to having little or no (or a large amount of) drawing occurring, the passage of a predetermined interval of time, or the current state of the battery (e.g., whether there is little battery life left—e.g., 10%—or whether the device was just plugged in to charge). An evaluation may be performed to determine what computational need exists based on the detected change or event (block 110). For example, if there are N GPU's available with each providing a different level of computational capability, the detected change may be mapped to one of N computational levels and the corresponding GPU identified. In another embodiment, if there are N GPUs the evaluated need may identify two or more GPUs (e.g., multiple GPUs to share the computational work load). In this latter embodiment, some of the GPUs may have the same computational capability. The currently active GPU(s) may then be identified (block 115), and a determination made as to whether a different GPU(s) is needed (block 120). If the needed GPU or computational capability does not match the level of power provided by the currently selected or active GPU(s) (the "YES" prong of block 120), a transition to the appropriate GPU(s) may be made (block 125) where after operation 100 waits for the next event (block 130). If the needed computational capability is in line with or matches that provided by the currently selected or active GPU(s) (the "NO" prong of block 120), no GPU transition is needed and operation 100 again waits for the next event (block 130).

Figure 2:
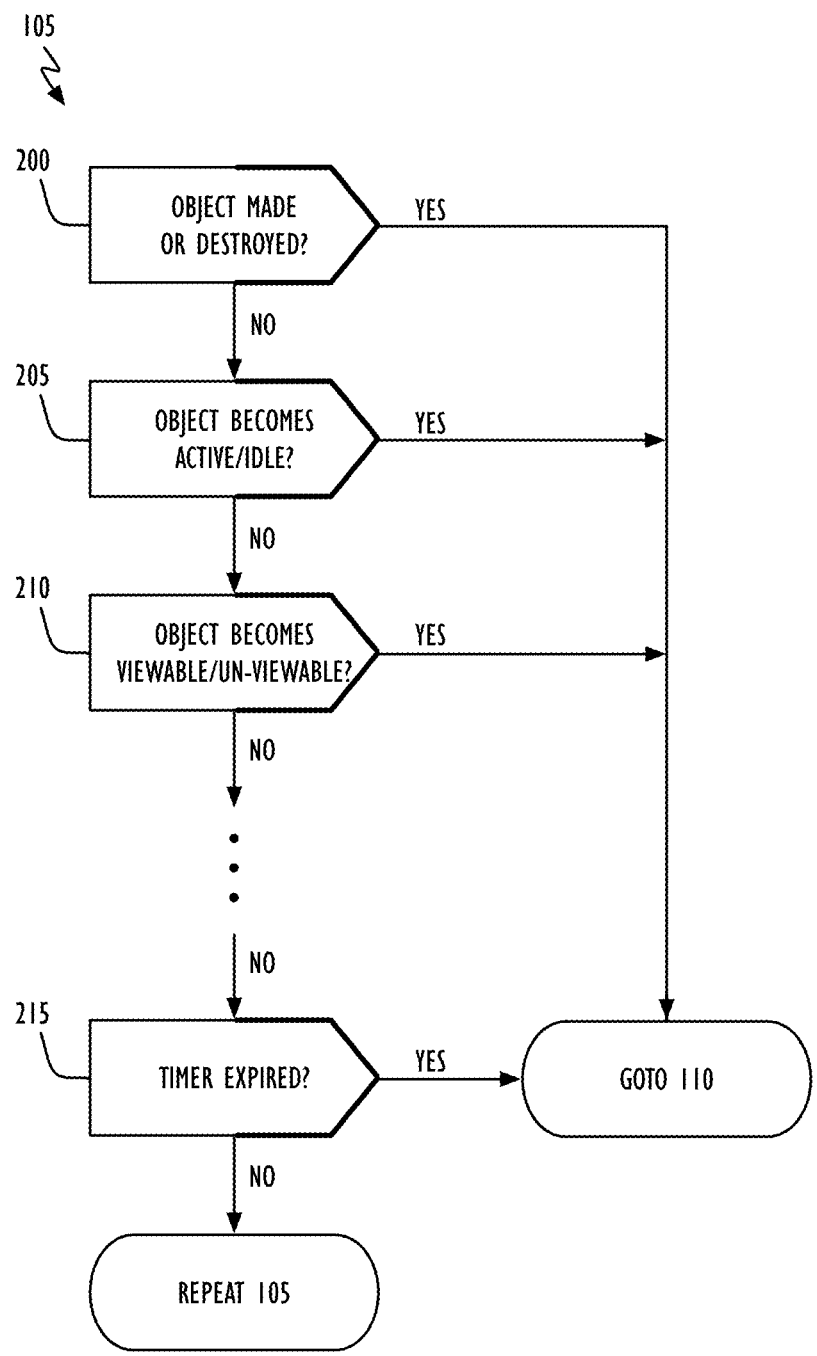
FIG. 2 shows, in flowchart form, an event detection operation in accordance with one or more embodiments.

Referring to FIG. 2, in one embodiment the operation of detecting an "event" in accordance with block 105 may include checking for the occurrence of any of a number of possible incidents or events (blocks 200-215). By way of example only, these events may include whether a GPU-centric object was created or destroyed (block 200), whether one or more GPU-centric objects became idle-after-being-active or active-after-being-idle (block 205), whether one or more GPU-centric objects become viewable (e.g., scrolled into view or uncovered by the movement of one or more windows) or un-viewable such as when scrolled out of site or covered (block 210), whether the active window is resized, whether the application itself specifies (explicitly or implicitly) that a certain GPU, type of GPU or GPU performance is needed, or whether a timed interval has expired (block 215). If any of these, or operationally similar, events occur (the "YES" prongs of blocks 200-215), GPU selection operation 100 may move to block 110. If none of the prior identified events are detected (the "NO" prongs of blocks 200-215), operation 100 may return to block 105. As used here, a "GPU-centric object" is any element that requires or calls for use of GPU resources. Illustrative GPU-centric objects include WebGL objects, Stage3D objects and Web-GPU objects.

Figure 3:
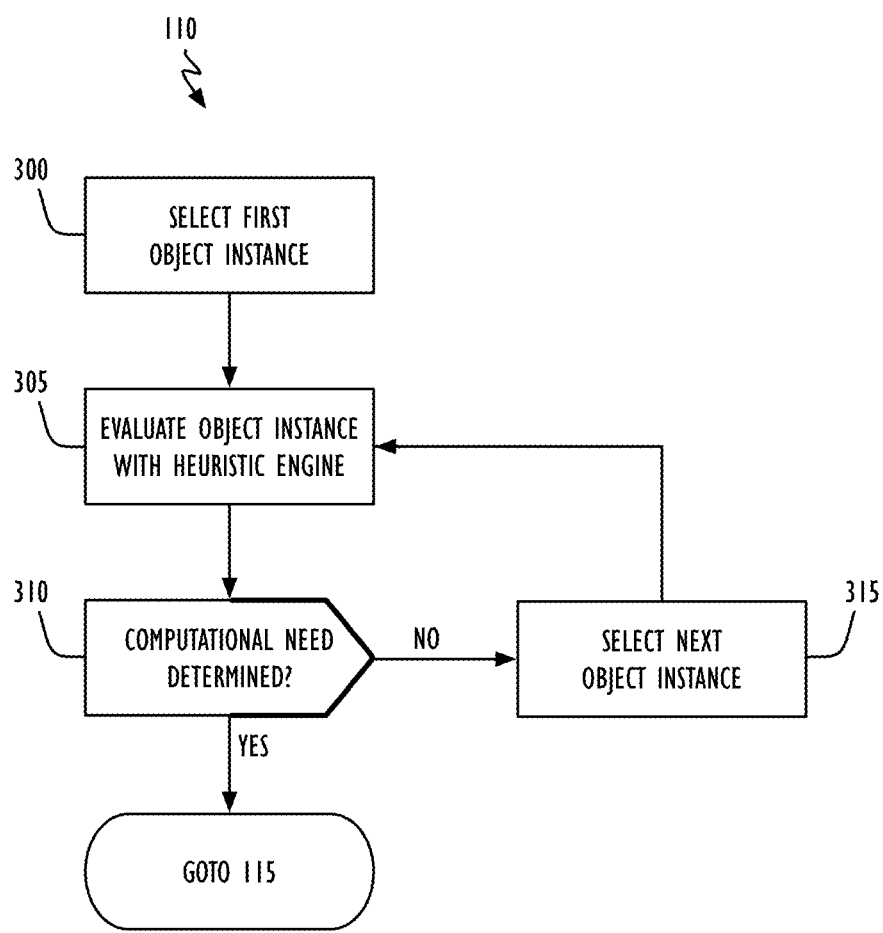
FIG. 3 shows, in flowchart form, a computational need determination operation in accordance with one or more embodiments.

Referring to FIG. 3, in one or more embodiments a system's computational need (based on a detected event) may begin by selecting a first GPU-centric object (block 300) and evaluating its computational need based one a series of heuristic rules (block 305). Table 1 below provides a sample of illustrative heuristics.

TABLE 1

| Example Heuristics to Evaluate GPU-Centric Objects |
|---|
| If instance |
|    newly idle or |
|    newly destroyed or |
|    newly not-visible |
| Then less GPU capability needed; |
| If instance |
|    newly active or |
|    newly created or |
|    newly visible |
| Then more GPU capability needed; |
| If instance renders to significant portion |
|    of screen |
| Then more GPU capability needed; |
| If other applications require GPU-X |
| Then at least GPU-X capability needed; |
| If instance explicitly requires GPU-Y |
| Then at least GPU-Y capability needed; |

Once the current object instance has been evaluated, a check may be made to determine is additional object instances remain to be evaluated (block 310). If at least one object instance remains to be evaluated (the "NO" prong of block 310), a next object instance may be selected (block 315) and evaluated as described above. If all object instances have been evaluated (the "YES" prong of block 310), GPU selection operation 100 may continue to block 115. In another embodiment, only a specified subset of object instance may be evaluated during performance of block 110. For example, only object instances associated with a display window that is at least partially visible may be evaluated.

Figure 4:
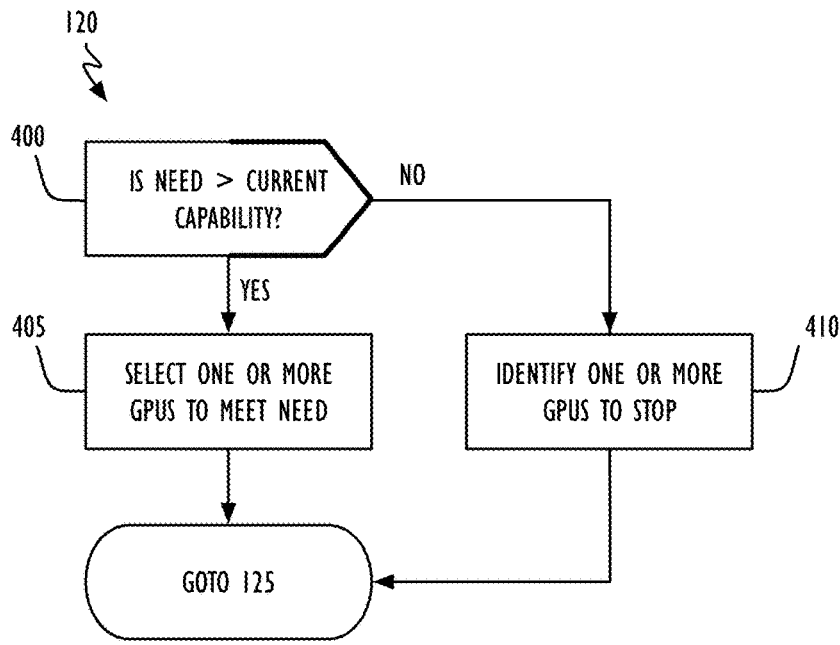
FIG. 4 shows, in flowchart form, a graphics processing unit (GPU) selection operation in accordance with one or more embodiments.

Once a system's computational need has been determined, GPU selection operation 100 may determine what GPU(s) are currently active. This information may be obtained, for example, through GPU-level system APIs. Referring to FIG. 4, if the current computational need is greater than that provided by the currently selected GPU(s) (the "YES" prong of block 400), an additional or different one or more GPUs may be identified (block 405) before operation moves to block 125. If the current computational need is less than that provided by the currently selected GPU(s) (the "NO" prong of block 400), one or more GPUs may be identified to stop or an altogether different GPU may be identified (block 410) before operation moves to block 125.

Figure 5:
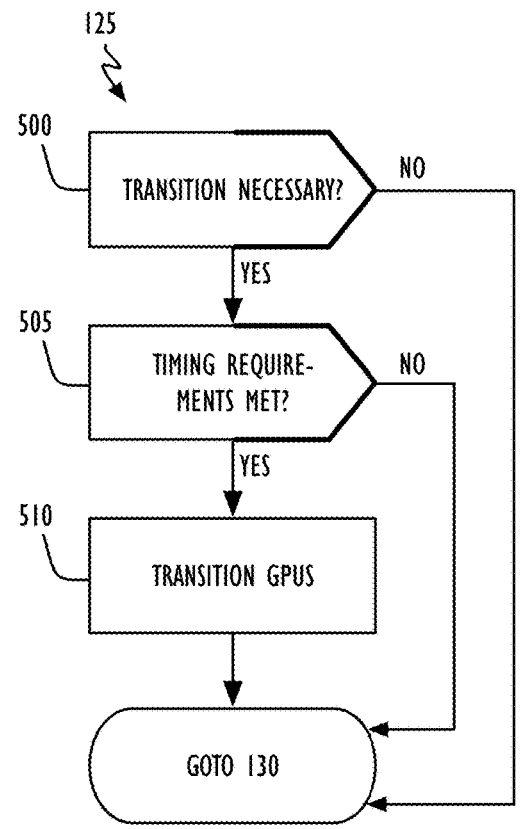
FIG. 5 shows, in flowchart form, a GPU transition operation in accordance with one or more embodiments.

Referring to FIG. 5, one embodiment of GPU transition operation 125 is shown in which a first check may be made to determine if a transition is necessary (block 500). For example, if the needed computational capability determined in accordance with FIG. 4 is equal to the currently provided capability—or within some specified range of "equal" (the "NO" prong of block 500), the currently selected GPU(s) may be retained; that is, no transition in accordance with block 125 would be needed. (This possibility is not explicitly provided for in FIG. 4.) If a transition is needed (the "YES" prong of block 500), a check to determine if a transition would meet certain specified timing requirements may be made (block 505). Timing requirements may include, but are not necessarily limited to, determining if less than a specified number of transitions have been made within a specified interval; or whether less than a minimum amount of time has elapsed since the last transition. If the specified timing requirements are not met (the "NO" prong of block 505, operation 100 continues to block 130. If the timing requirements are not violated (the "YES" prong of block 505), the system may be transitioned to the identified GPUs (block 510). In one embodiment, a currently selected GPU (i.e., a GPU currently selected by the system to execute GPU instructions) may be transitioned from the active state to an idle state before, or coincidently with, transitioning the newly selected GPU from an idle state to an active state. In another embodiment, the newly selected GPU may be transitioned from the idle state to the active state while the system continues to use the currently selected GPU; that is, the currently selected GPU and the newly selected GPU may share the system's GPU-specific load.

Tables 2 through 4 provide pseudo-code that may be used to guide the implementation of the disclosed subject matter in a computational system supports the WebGL API and has two (2) GPUs (one GPU may be a lower-performance/lower-power device while the other a higher-performance/higher-power device). The Web Graphics Library (WebGL) is a JavaScript API for rendering 3D graphics within any compatible application. WebGL elements can be mixed with other embedded objects and/or HyperText Markup Language (HTML) elements and composited with other parts of a page or page background. WebGL programs consist of control code written in JavaScript and shader code that is written in the OpenGL Shading Language (GLSL) which is executed by a computer system's GPU. GLSL is a high-level shading language created by the OpenGL Architecture Review Board (ARB) to give developers more direct control of the graphics pipeline without having to use ARB assembly language or hardware-specific languages. Referring to Table 2, the "createWebGL" routine may be called every time a WebGL object is instantiated (created). As shown, the system defaults to using the lower power GPU, and thereafter sends a messages to the host controller ("host") that a new WebGL object has been created.

TABLE 2

WebGL Object Creation Pseudo-Code

```
createWebGL( ) {
    // for each WebGL instance, construct an
    // OpenGL context that does NOT request
    // the high-power GPU
    var options = { OpenGLCanUseLowPowerGPU }
    global glContext =
    OpenGL.createContext(options);
    // tell the host/controller that something
```

TABLE 2-continued

WebGL Object Creation Pseudo-Code

```
    // has changed
    host.sendMessage(WebGLHasUpdated);
}
```

Table 3 shows how the host controller may respond to a message generated in accordance with the pseudo-code of Table 2 (i.e., to the creation of a WebGL object). More specifically, it checks the new object's GPU requirements.

TABLE 3

Host Controller Pseudo-Code

```
receiveMessage (message) {
    if (message == WebGLHasUpdated) {
        checkGPURequirements( );
    }
    // handle any other message types
}
```

Table 4 provides pseudo-code for how one implementation of a 2 GPU system checks for the GPU requirements a WebGL object needs. Additional details may be obtained from Table 4's internal comments.

TABLE 4

GPU Requirement Check Pseudo-Code

```
checkGPURequirements( ) {
    // look at all known WebGL instances, and
    // decide if the high-power GPU should be
    // used
    needsHighPowerGPU = false;
    for (x in webglContexts) {
        // evaluate heuristics (see discussion
        // above), only some of which are
        // implemented here e.g., check the size
        // of the WebGL object, if it is obscured,
        // idle, etc.
        if (x.wantsBetterGPU( )) {
            needsHighPowerGPU = true;
            break;
            // Exit because the result is known,
            // alternatively a minimum number of
            // WebGL objects could be required in
            // this mode
        }
    }
    if needsHighPowerGPU {
        triggerHighPowerGPUIfNecessary( );
    }
    else {
        releaseHighPowerGPUIfNecessary( );
    }
}
global highPowerGPUContext = null;
triggerHighPowerGPUIfNecessary( ) {
    if (highPowerGPUContext != null) {
        // work already done, simply return
        return;
    }
    var options = { OpenGLMustUseHighPowerGPU };
    // demand the system use a particular GPU
    global highPowerGPUContext =
        OpenGL.createContext(options);
    // once this global object exists, the system
    // may swap to the high-power GPU, causing all
    // WebGL instances to migrate to the high-
    // power GPU
}
releaseHighPowerGPUIfNecessary( ) {
    if (highPowerGPUContext == null) {
        // if not forcing the GPU, nothing need be
        // done
```

TABLE 4-continued

GPU Requirement Check Pseudo-Code

```
        return;
    }
    highPowerGPUContext = null;
    // Once this global object is erased, the
    // system is free to swap back to the lower-
    // power GPU
}
```

While the above detailed example is directed to a WebGL API compliant 2 GPU system, in general any computational environment that supports the embedding of objects that execute GPU directed code and has two or more GPU's may benefit from the techniques disclosed herein. The GPUs may be similar or dissimilar. For example, all of a system's GPUs could be functionally equivalent (and consume equal amounts of power). In other embodiments the GPUs could be dissimilar. One or more could be lower-performance/lower-power while others (one or more) could be higher-performance/higher-power devices. In addition, one (or more) GPUs could be combined with one or more central processing units (CPUs) on a common substrate while other GPUs could be separate (e.g., discrete) from the CPU and, possibly, from other GPUs. Some of the GPUs may have multiple cores, others may have single cores. Some of the GPUs may be programmable, others may not.

Figure 6:
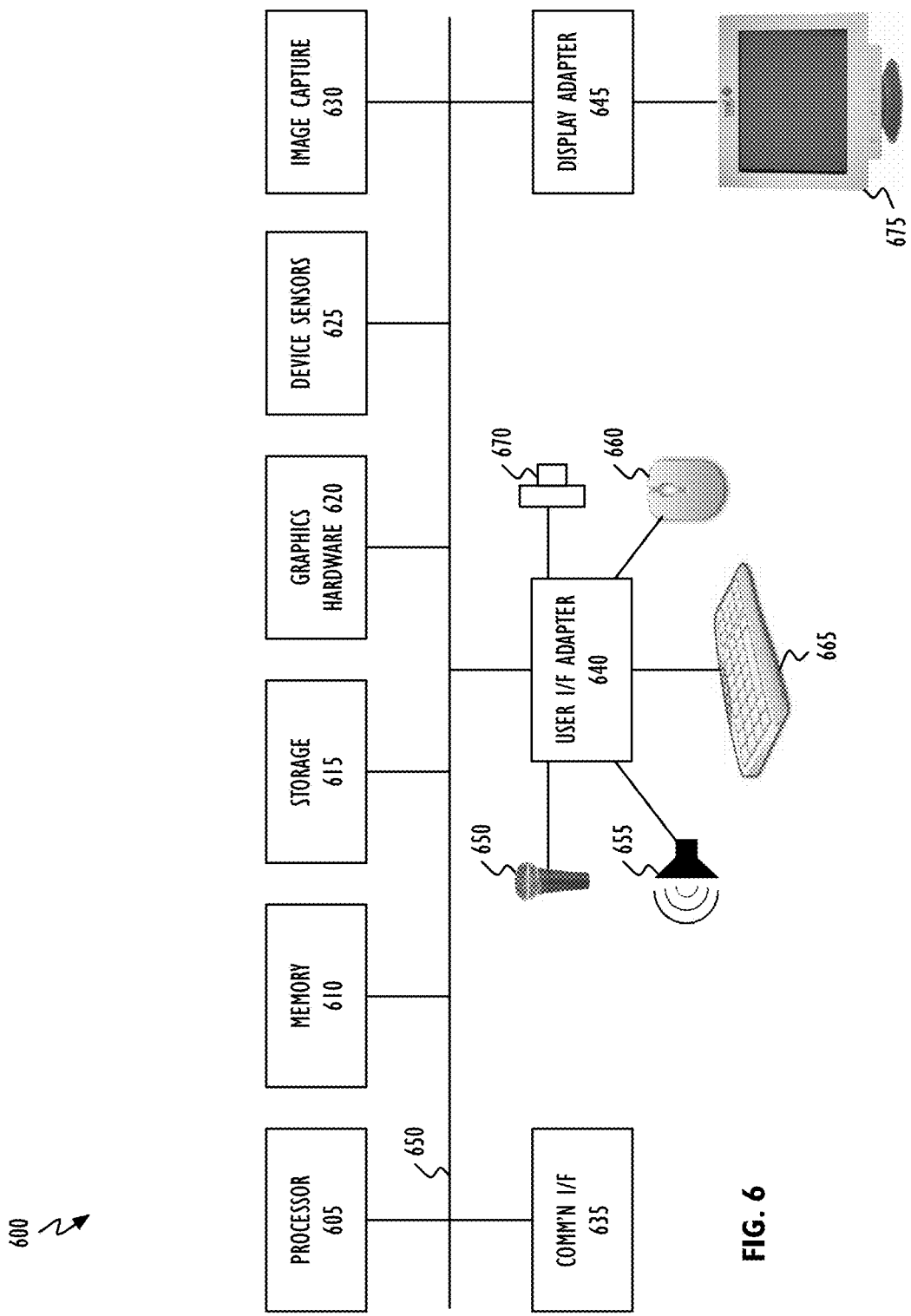
FIG. 6 shows, in block diagram form, a computer system in accordance with one or more embodiments.

Referring to FIG. 6, the disclosed GPU power and performance management operations in accordance with this disclosure may be performed by representative computer system 600 (e.g., a general purpose computer system such as a desktop, laptop, notebook or tablet computer system, or a gaming device). Computer system 600 can be housed in single computing device or spatially distributed between two or more different locations. Computer system 600 may include one or more processors 605, memory 610, one or more storage devices 615, graphics hardware 620, device sensors 625, image capture module 630, communication interface 635, user interface adapter 640 and display adapter 645—all of which may be coupled via system bus or backplane 650.

Processor module or circuit 605 may include one or more processing units each of which may include at least one central processing unit (CPU) and zero or more GPUs; each of which in turn may include one or more processing cores. Each processing unit may be based on reduced instruction-set computer (RISC) or complex instruction-set computer (CISC) architectures or any other suitable architecture. Processor module 605 may be a system-on-chip, an encapsulated collection of integrated circuits (ICs), or a collection of ICs affixed to one or more substrates. Memory 610 may include one or more different types of media (typically solid-state, but not necessarily so) used by processor 605, graphics hardware 620, device sensors 625, image capture module 630, communication interface 635, user interface adapter 640 and display adapter 645. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions or code organized into one or more modules and written in any desired computer programming languages (e.g., WebGL and/or the GLSL language), and any other suitable data. Graphics hardware module or circuit 620 may be special purpose computational hardware for processing graphics and/or assisting processor 605 perform computational tasks. In one embodiment, graphics hardware 620 may include one or more GPUs, and/or one or more programmable GPUs and each such unit may include one or more processing cores. When executed by processor(s) 605 and/or graphics hardware 620 computer program code may implement one or more of the methods described herein. Device sensors 625 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Image capture module or circuit 630 may include one or more image sensors, one or more lens assemblies, and any other known imaging component that enables image capture operations (still or video). In one embodiment, the one or more image sensors may include a charge-coupled device (CCD) or complementary metal oxide semiconductor (CMOS) sensor. Image capture module 630 may also include an image signal processing (ISP) pipeline that is implemented as specialized hardware, software, or a combination of both. The ISP pipeline may perform one or more operations on raw images (also known as raw image files) received from image sensors and can also provide processed image data to processor 605, memory 610, storage 615, graphics hardware 620, communication interface 635 and display adapter 645. Communication interface 635 may be used to connect computer system 600 to one or more networks. Illustrative networks include, but are not limited to, a local network such as a Universal Serial Bus (USB) network, an organization's local area network, and a wide area network such as the Internet. Communication interface 635 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 640 may be used to connect microphone(s) 650, speaker(s) 655, pointer device(s) 660, keyboard 665 (or other input device such as a touch-sensitive element), and a separate image capture element 670—which may or may not avail itself of the functions provided by graphics hardware 620 or image capture module 630. Display adapter 645 may be used to connect one or more display units 675 which may also provide touch input capability. System bus or backplane 650 may be comprised of one or more continuous (as shown) or discontinuous communication links and be formed as a bus network, a communication network, or a fabric comprised of one or more switching devices. System bus or backplane 650 may be, at least partially, embodied in a network router or hub, a wireless access point (AP) or repeater, a set-top box, or a combination thereof.

Referring to FIG. 7, a simplified functional block diagram of illustrative mobile electronic device 700 is shown according to one embodiment. Electronic device 700 could be, for example, a mobile telephone, personal media device, a notebook computer system, or a tablet computer system. As shown, electronic device 700 may include processor module or circuit 705, display 710, user interface module or circuit 715, graphics hardware module or circuit 720, device sensors 725, microphone(s) 730, audio codec(s) 735, speaker(s) 740, communications module or circuit 745, image capture module or circuit 750, video codec(s) 755, memory 760, storage 765, and communications bus 770.

Processor 705, display 710, user interface 715, graphics hardware 720, device sensors 725, communications circuitry 745, image capture module or circuit 750, memory 760 and storage 765 may be of the same or similar type and serve the same or similar function as the similarly named component described above with respect to FIG. 6. Audio signals obtained via microphone 730 may be, at least partially, processed by audio codec(s) 735. Data so captured may be stored in memory 760 and/or storage 765 and/or output through speakers 740. Output from image capture module or circuit 750 may be processed, at least in part, by video codec(s) 755 and/or processor 705 and/or graphics hardware 720. Images so captured may be stored in memory 760 and/or storage 765.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in any of FIGS. 1-5 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A computer system, comprising:
   a memory operatively coupled to the display unit;
   two or more graphics processing units (GPUs) operatively coupled to the memory; and
   one or more processors operatively coupled to the memory and the GPUs, the processors configured to execute program instructions stored in the memory for causing the computer system to—
   detect an event based on an action associated with a GPU-centric object embedded in a page of an application, the GPU-centric object including GPU instructions and non-GPU instructions,
   determine, in response to the event, a computational need of the computer system based on heuristic rules that evaluate a status and a size of multiple GPU-centric objects including the GPU-centric object embedded in the page of the application,
   identify a first GPU of the two or more GPUs is a currently active GPU for the system,
   identify, based on the computational need, a second GPU, wherein the second GPU is different from the first GPU,
   transition the system from the first GPU to the second GPU, and
   execute the GPU-centric object's GPU instructions on the second GPU.

2. The computer system of claim 1, wherein the GPU-centric object comprises one of a WebGL object, a WebGPU object, and a Stage3D object.

3. The computer system of claim 1, wherein the heuristic rules evaluate a change in a viewable characteristic of the GPU-centric object.

4. The computer system of claim 3, wherein the viewable characteristic comprises one or more of the following:
   the GPU-centric object changes its operational state from active to idle;
   the GPU-centric object changes its operational state from idle to active;
   the GPU-centric object changes its operational state from not-viewable to viewable; and
   the GPU-centric object changes its operational state from viewable to not-viewable.

5. The computer system of claim 1, wherein the first GPU comprises a GPU having a lower-computational capacity than the second GPU.

6. The computer system of claim 1, wherein the instructions to cause the computer system to transition from the first GPU to the second GPU comprise instructions to cause the system to:
   take the second GPU from an idle state to an active state; and
   execute the GPU-centric object's GPU instructions with the second GPU once the second GPU is in the active state.

7. The computer system of claim 6, further comprising instructions to cause the computer system to take the first GPU from an active state to an idle state prior to executing the GPU-centric object's GPU instructions with the second GPU.

8. The computer system of claim 6, wherein the instructions cause the computer system to take the second GPU from the idle state to the active state comprise instructions to cause the computer system to:
   evaluate at least one time restriction related to the second GPU; and
   transition the second GPU from the idle state to the active state based on the evaluation.

9. A non-transitory program storage device having instructions stored thereon to cause, when executed by one or more processors, the one or more processors to:
   detect an event in a system based on an action associated with a GPU-centric object embedded in a page of an application, the system having two or more graphics processing units (GPUs), the GPU-centric object including GPU instructions and non-GPU instructions;
   determine, in response to the event, a computational need of the system based on heuristic rules that evaluate a status and a size of multiple GPU-centric objects including the GPU-centric object embedded in the page of the application;
   identify a first GPU of the two or more GPUs is a currently active GPU for the system;
   identify, based on the computational need, a second GPU, wherein the second GPU is different from the first GPU;
   transition the system from the first GPU to the second GPU; and
   execute the GPU-centric object's GPU instructions on the second GPU.

10. The non-transitory program storage device of claim 9, wherein the GPU-centric object comprises one of a WebGL object, a WebGPU object, and a Stage3D object.

11. The non-transitory program storage device of claim 9, wherein the heuristic rules evaluate a change in a viewable characteristic of the GPU-centric object.

12. The non-transitory program storage device of claim 11, wherein the viewable characteristic comprises one or more of the following:
the GPU-centric object changes its operational state from active to idle;
the GPU-centric object changes its operational state from idle to active;
the GPU-centric object changes its operational state from not-viewable to viewable; and
the GPU-centric object changes its operational state from viewable to not-viewable.

13. The non-transitory program storage device of claim 9, wherein the first GPU comprises a GPU having a lower-computational capacity than the second GPU.

14. The non-transitory program storage device of claim 9, wherein the instructions to cause the system to transition from the first GPU to the second GPU comprise instructions to cause the system to:
take the second GPU from an idle state to an active state; and
execute the GPU-centric object's GPU instructions with the second GPU once the second GPU is in the active state.

15. The non-transitory program storage device of claim 14, further comprising instructions to cause the system to take the first GPU from an active state to an idle state prior to executing the GPU-centric object's GPU instructions with the second GPU.

16. The non-transitory program storage device of claim 14, wherein the instructions to cause the system to take the second GPU from the idle state to the active state comprise instructions to cause the system to:
evaluate at least one time restriction related to the second GPU; and
transition the second GPU from the idle state to the active state based on the evaluation.

17. A method to select a graphics processing unit (GPU), comprising:
detecting an event in a system based on an action associated with a GPU-centric object embedded in a page of an application, the system having two or more GPUs, the GPU-centric object including GPU instructions and non-GPU instructions;
determining, in response to the event, a computational need of the system based on heuristic rules that evaluate a status and a size of multiple GPU-centric objects including the GPU-centric object embedded in the page of the application;
identifying a first GPU of the two or more GPUs is a currently active GPU for the system;
identifying, based on the computational need, a second GPU, wherein the second GPU is different from the first GPU;
transitioning the system from the first GPU to the second GPU; and
executing the GPU-centric object's GPU instructions on the second GPU.

18. The method of claim 17, wherein the GPU-centric object comprises one of a WebGL object, a WebGPU object, and a Stage3D object.

19. The method of claim 17, wherein the heuristic rules evaluate a change in a viewable characteristic of the GPU-centric object.

20. The method of claim 19, wherein the viewable characteristic comprises one or more of the following:
the GPU-centric object changes its operational state from active to idle;
the GPU-centric object changes its operational state from idle to active;
the GPU-centric object changes its operational state from not-viewable to viewable; and
the GPU-centric object changes its operational state from viewable to not-viewable.

21. The method of claim 17, wherein the first GPU comprises a GPU having a lower-computational capacity than the second GPU.

22. The method of claim 17, wherein transitioning from the first GPU to the second GPU comprises:
taking the second GPU from an idle state to an active state; and
executing the GPU-centric object's GPU instructions with the second GPU once the second GPU is in the active state.

23. The method of claim 22, further comprising taking the first GPU from an active state to an idle state prior to executing the GPU-centric object's GPU instructions with the second GPU.

24. The method of claim 22, wherein taking the second GPU from the idle state to the active state comprises:
evaluating at least one time restriction related to the second GPU; and
transitioning the second GPU from the idle state to the active state based on the evaluation.

* * * * *